United States Patent [19]

Porter, Jr. et al.

[11] 4,157,577

[45] Jun. 5, 1979

[54] ROTATABLE STORAGE APPARATUS WITH DIGITALLY RESPONSIVE CIRCUITRY FOR TRACK SELECTION

[75] Inventors: Townsend H. Porter, Jr.; Robert E. Schopp, both of Rochester, Minn.

[73] Assignee: International Business Machines Corporation, Armonk, N.Y.

[21] Appl. No.: 851,089

[22] Filed: Nov. 14, 1977

[51] Int. Cl.² .......................... G11B 5/00; G11B 21/08
[52] U.S. Cl. ........................................ 360/77; 360/78; 360/97
[58] Field of Search .................... 360/77–78, 360/135, 134, 136, 97

[56] References Cited

U.S. PATENT DOCUMENTS

| 3,491,347 | 1/1970 | Farrand | 360/77 |
| 3,812,533 | 5/1974 | Kimura | 360/77 |

FOREIGN PATENT DOCUMENTS 2554083  6/1977  Fed. Rep. of Germany ............. 360/77

OTHER PUBLICATIONS

IBM Technical Disclosure Bulletin.

Primary Examiner—John H. Wolff
Attorney, Agent, or Firm—Keith T. Bleuer

[57] ABSTRACT

A magnetic disk provided with different digital bytes inside and outside of the center line of a magnetic track on the disk, and transducer and recording mechanism for detecting the passage of the digital bytes across the transducer and recording these bytes as the disk rotates so as to determine the distance the center of the transducer is spaced from the center line of the magnetic track. The recorded digital information is used for stepping a transducer stepping motor a distance corresponding to the stored digital information to move the transducer to have its center in correspondence with the center of the track. In one embodiment, the digital information is stored in a circular reference track adjacent the edge of the disk, and in another embodiment the digital information is stored in spiral tracks extending toward the center of the disk.

33 Claims, 9 Drawing Figures

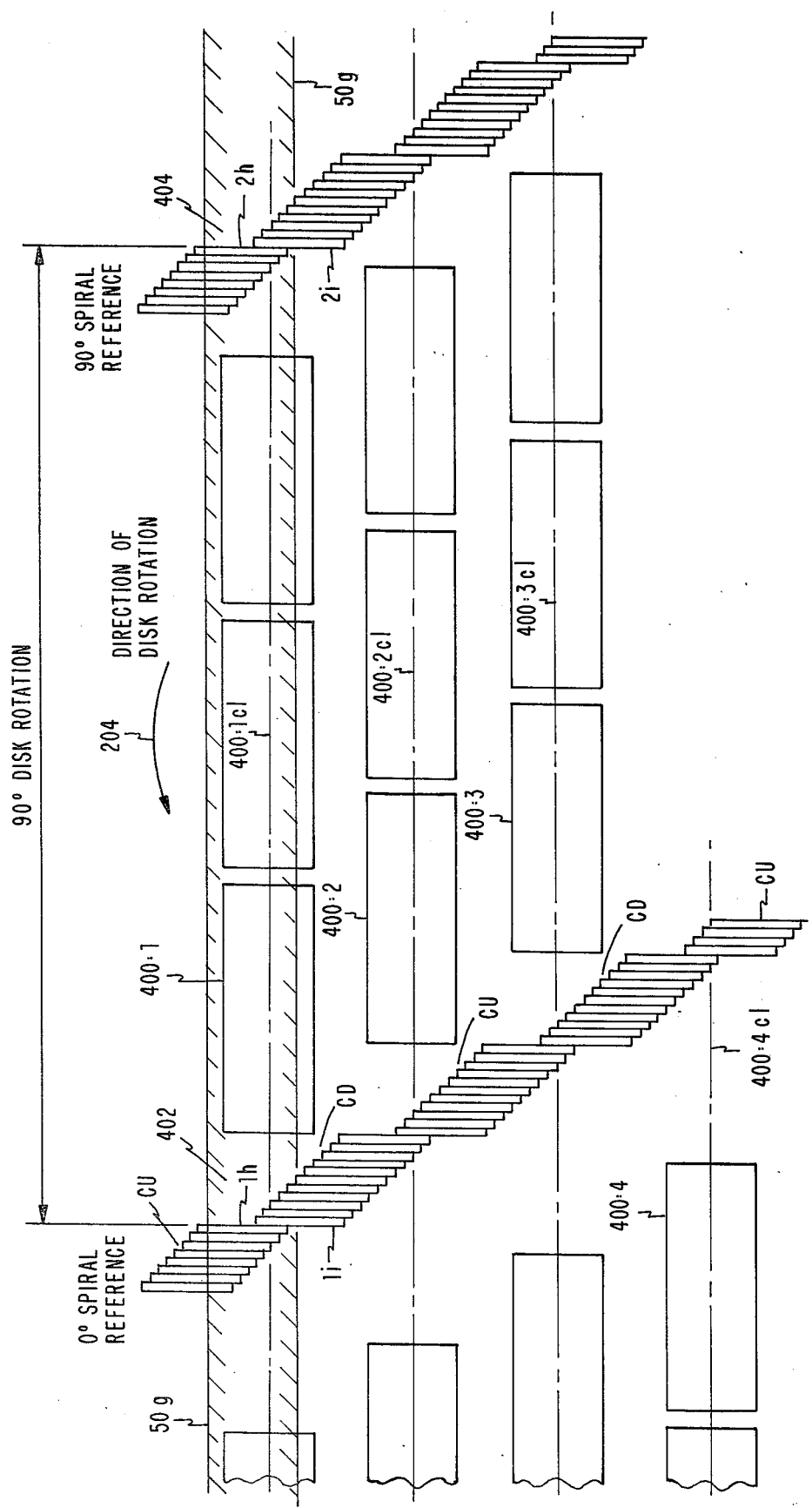

ROTATABLE STORAGE APPARATUS WITH DIGITALLY RESPONSIVE CIRCUITRY FOR TRACK SELECTION

BACKGROUND OF THE INVENTION

The invention relates to data storage apparatus and more particularly to rotatable magnetic disks. Still more particularly, the invention relates to controlling circuitry for moving a transducer into registration with a desired track on the magnetic disk.

Previously, several techniques have been used to provide the registration of a transducer on a magnetic track of a rotatable disk with high track densities. The two most common approaches have used dynamic servoing with a linear voice coil motor to access a transducer using either a separate servo head on dedicated servo tracks or using sector servoing in which the servo information is disposed in radially extending sectors interleaved with sectors of data. In either case, the servo information is derived and processed with an analog servo channel dedicated to this task, and such an approach is disclosed, for example, in John R. Taylor U.S. Pat. No. 3,936,876.

SUMMARY OF THE INVENTION

It is an object of the present invention to provide mechanism responsive to digital reference data recorded on a moving magnetic medium in order to centralize a magnetic transducer with respect to a desired track on the moving medium. More particularly, it is an object of the invention to provide different types of digital reference data on the opposite sides of a center line of the desired track and to provide means for detecting and storing indications of this data as the medium moves past the transducer so that it can be determined how far the transducer should be moved in order to centralize it with respect to the center line of the desired track. It is also an object to provide transducer moving means including a stepper motor for centralizing the transducer on the track in accordance with these stored indications.

It is also an object of the invention to provide a reference track on a magnetic disk or the like having such digital information recorded in segments on it, with staggering of the segments being substantially equal to the distance (or a multiple or sub-multiple thereof) that the stepper motor under control of this information may move the transducer per step in moving the transducer across the track.

In a preferred form of the invention, the magnetic disk thereof may include a reference track having count up and count down digital segments recorded on opposite sides of the center line of a circular reference track on the disk. In another form, the magnetic recording of digital information on a disk may take the form of spiral tracks extending from the outermost data track on the disk to the innermost data track on the disk, with the spiral tracks interrupting the data. This digital data is read by the transducer of the apparatus which functions as well to read data from the disk, and the numbers of count up and count down segments for any particular track are recorded, with the difference indicating the number of steps that a stepper motor driving the transducer must take in order to move the transducer to have its center in substantial correspondence with the center line of a desired magnetic track. Drive circuity for the stepper motor is also included under control of the recorded digital information so as to move the transducer to a central position on a track.

BRIEF DESCRIPTION OF THE DRAWINGS

FIG. 6 is a diagram showing the spiral reference tracks of recording on the disk of FIG. 5 together with the associated data tracks.

DESCRIPTION OF THE PREFERRED EMBODIMENTS

Figure 1:
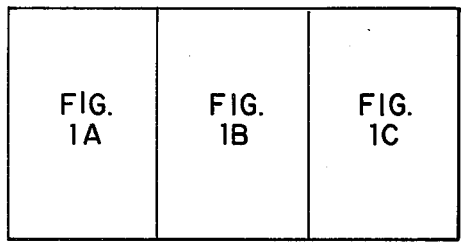
FIG. 1 is a diagram showing the manner in which FIGS. 1A, 1B and 1C shall be placed together in order to provide a full showing of the transducer control circuit of the invention.
Figure 1A:
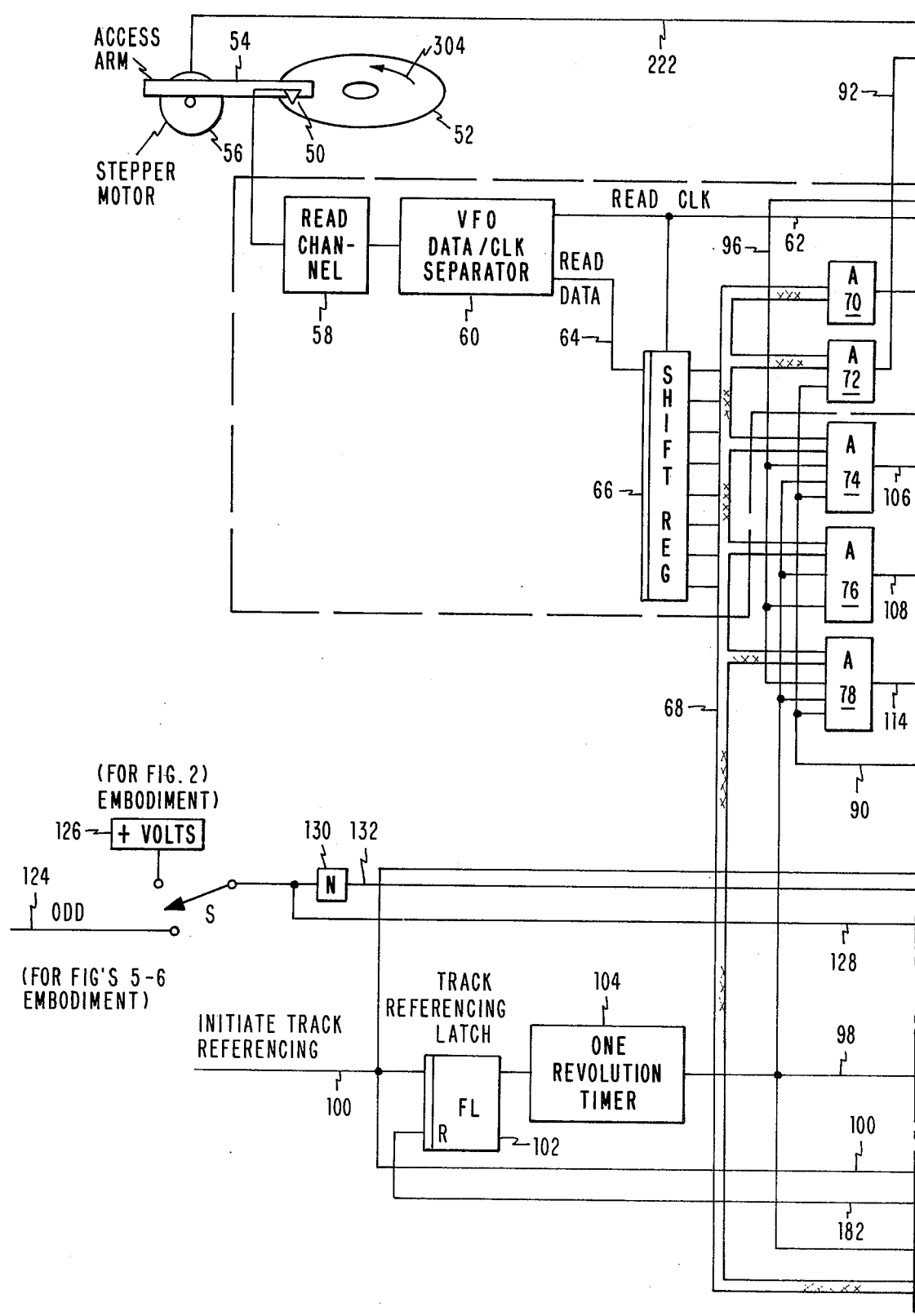
Figure 1B:
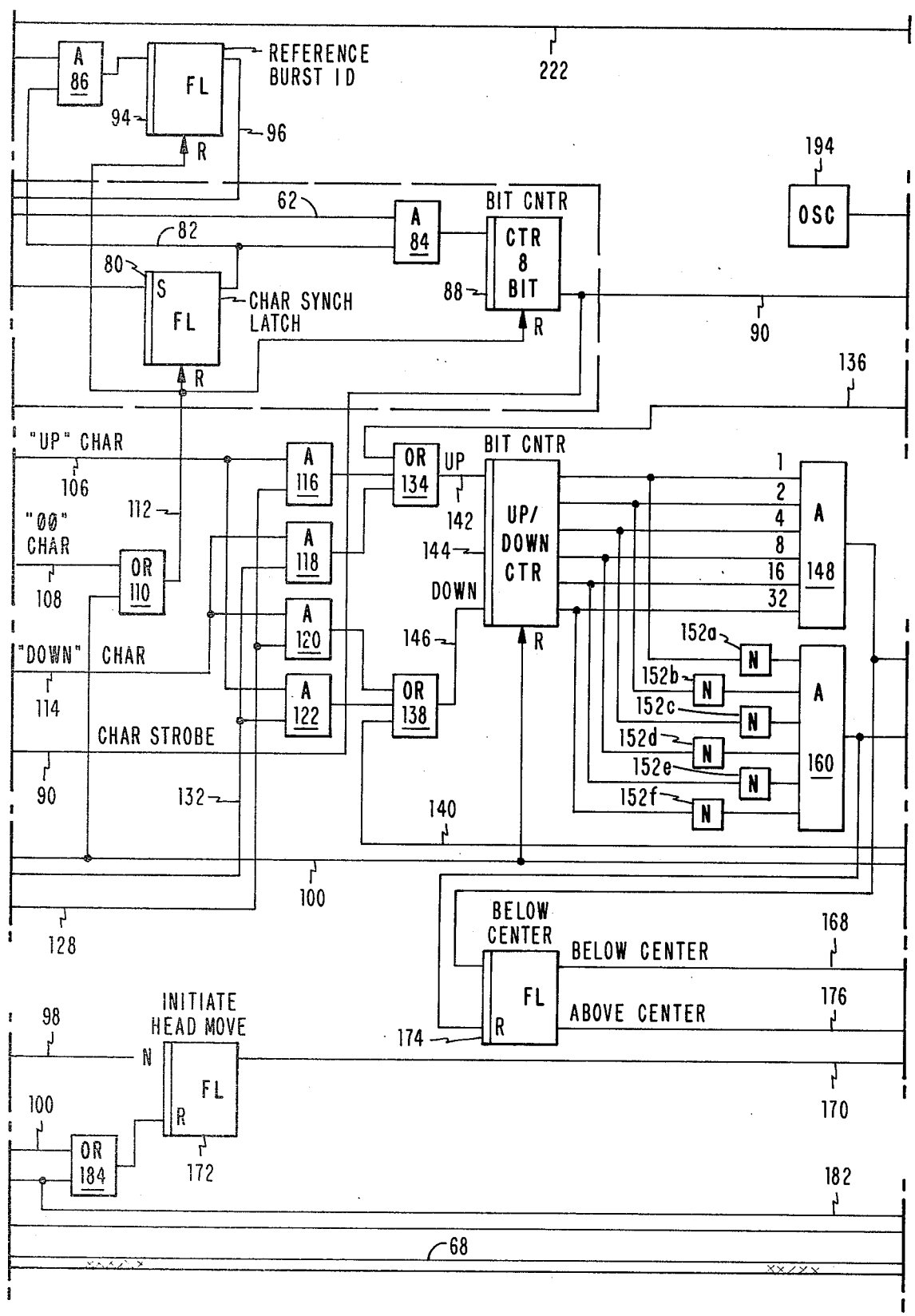
Figure 1C:
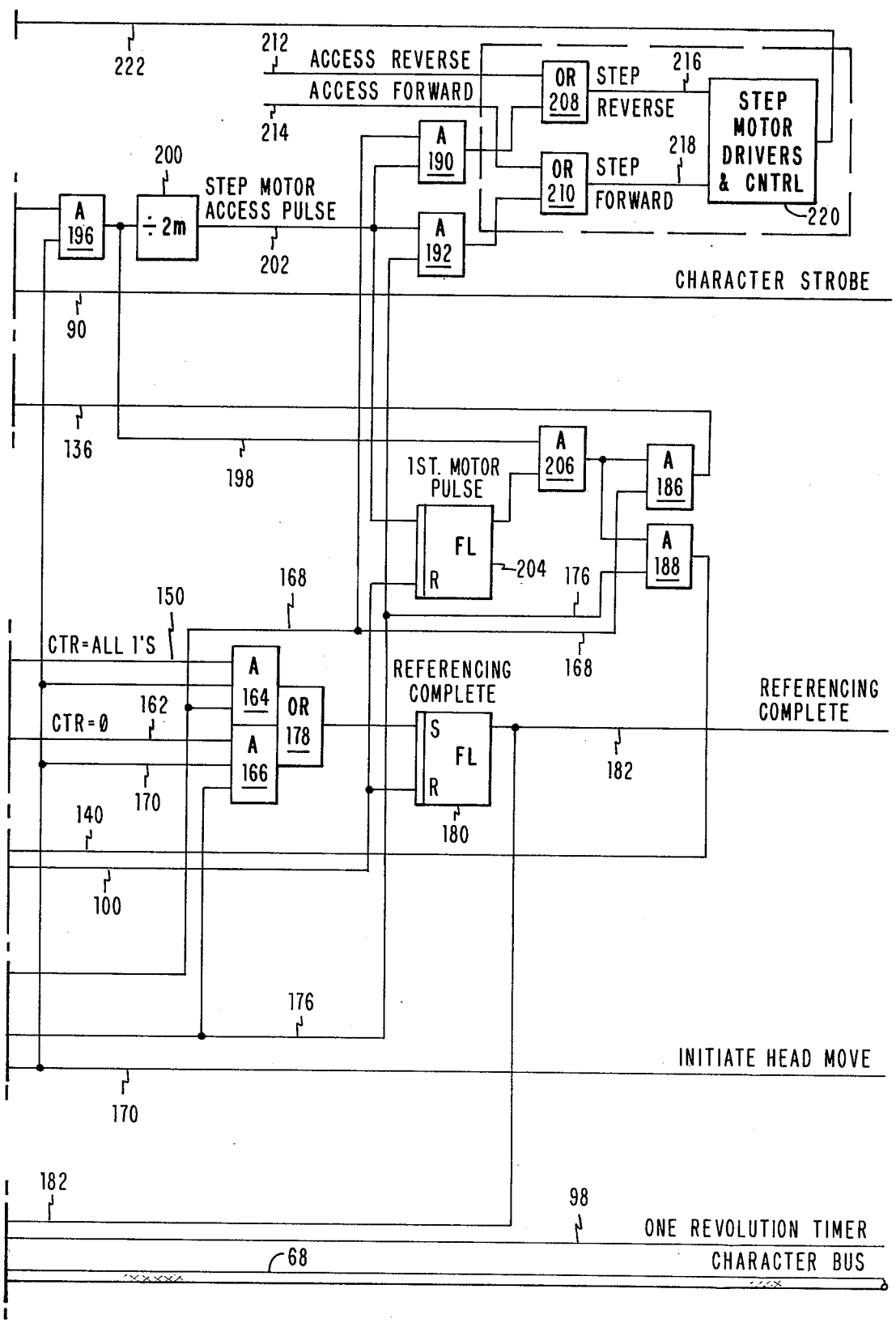

Referring to FIGS. 1A, 1B and 1C, assembled as shown in FIG. 1, the control circuit illustrated therein is one for controlling the movement of a magnetic head or transducer 50 across a magnetic disk 52. The disk 52 may be of thin flexible material, such as polyethelyne terephthalate of about 0.003 inch (0.075 mm) thickness, and the disk 52 has an unoriented $FE_2O_3$ coating on at least its upper surface which is illustrated in FIG. 1A. The disk 52 may, for example, be of the type disclosed in U.S. Pat. No. 3,668,658 and may be contained in a protective jacket if desired, as taught by said patent. The disk 52 is rotatably driven by any suitable disk drive motor means. The transducer 50 is carried by an access arm 54 that is suitably mechanically connected to a motor 56 of the electrical stepping type so as to step the transducer 50 across the disk 52 as the disk 52 is rotatably driven.

The transducer 50 is electrically connected with a read channel 58 that in turn drives a VFO Data Clock separator 60. The separator 60 has an output line 62 carrying a Read Clock signal and has an output line 64 carrying a Read Data signal. The line 64 carries data pulses or bits corresponding to data read from the disk 52 by the transducer 50, and the line 62 carries clock pulses which occur for every data bit cell. The lines 62 and 64 are connected as inputs to a shift register 66 which has a length of eight bits. The Read Data signal on line 64 is supplied to the first bit position of the shift register 66 while the Read Clock signal on line 62 causes the data from line 64 to be shifted through the shift register.

The eight positions of the shift register 66 are connected separately to an output bus 68. The bus 68 is connected to AND circuits 70, 72, 74, 76 and 78. All of the AND circuits 70, 72, 74, 76 and 78 are for the recognition of various characters read from the disk 52 by the transducer 50. More particularly, the AND circuit 70 is for the recognition of a SYNCH Character; the AND circuit 72 is for the recognition of an ID Character; the AND circuit 74 is for the recognition of an UP Character; the AND circuit 76 is for the recognition of a 00

Character; and the AND circuit 78 is for the recognition of a DOWN Character. In each case, the AND circuit is so constructed that it only provides an output when the particular character is in the data stream from the transducer 50 and is subsequently on the bus 68.

The output of the AND circuit 70 is connected to a Character Synch latch 80, and the output line 82 of the latch 80 is connected to AND circuits 84 and 86. The AND circuit 84 has the Read Clock line 62 as an input and has its output connected to a bit counter 88 of eight bits. The bit counter 88 has an output line 90 carrying a Character Strobe signal which occurs for every eight bits supplied to counter 88.

The AND circuit 72 has its output line 92 connected as an input to the AND circuit 86 along with the line 82, and the AND circuit 86 drives a latch 94 which has an output line 96.

The AND circuit 74 has a line 98 as an input in addition to the bus 68 and lines 90 and 96. The line 98 carries a timed signal which is under the control of the host system (the CPU for which data is read from disk 52 and from which data is written on disk 52, both by means of the transducer 50). The host system supplies the Initiate Track Referencing signal (in the form of a pulse) on a line 100, and line 100 is connected as an input to a Track Reference latch 102. The latch 102 has its output connected to a One Revolution timer 104, and the timer 104 has the line 98 as its output. The AND circuit 74 has its output on a line 106 carrying the signal UP Character.

The AND circuit 76 has the lines 90 and 96 as inputs in addition to the bus 68 and has its output on a line 108 carrying the signal 00 Character. The line 108 is applied onto an OR circuit 110 along with the line 100 as inputs. The OR circuit 110 has the line 112 as an output which is applied to reset terminals of the latches 80 and 94 and counter 88.

The AND circuit 78 has the lines 90, 98 and 96 as inputs along with the bus 68. The line 114 constitutes the output line of the AND circuit 78 and carries the signal DOWN Character.

AND circuits 116, 118, 120 and 122 are provided for reversing the application of the UP Character and DOWN Character signals on lines 106 and 114, when desired, under the control of the host system. The host system has an Odd output line 124, and a switch S is provided for connecting the line 124 or a source 126 of + volts with a line 128 that is applied as inputs to AND circuits 116 and 120. The connection with the + voltage source 126 is made for adapting the circuit shown in FIGS. 1A–1C for use with the FIG. 2 pattern of reference track magnetization, while the switch S is moved to connect the host system output line 124 with the line 128 for adapting the circuitry of FIGS. 1A–1C for use with the reference magnetization pattern shown in FIG. 5. The switch S is connected through an inverter 130 with a line 132 that is connected as inputs to the AND circuits 118 and 122. In addition, the AND circuits 116 and 122 has the UP Character line 106 as inputs, and the AND circuits 118 and 120 has the DOWN Character line 114 as inputs.

An OR circuit 134 has the outputs of AND circuits 116 and 118 as inputs and in addition has a line 136 as an input. An OR circuit 138 has the outputs of AND circuits 120 and 122 as inputs and in addition has a line 140 as an input. The output of the OR circuit 134 is on a line 142 applied to the "UP" count terminal of an UP/DOWN counter 144, and the output of the OR circuit 138 is on a line 146 which is applied to the "DOWN" count terminal of the counter 144. The line 100 is applied to the Reset Terminal of the counter 144.

The counter 144 is shown with the four output lines (1, 2, 4, 8, 16 and 32) which respectively connect to individual cells of the counter 144. Each of the output lines (1, 2, 4, 8, 16 and 32) is connected directly to an AND circuit 148, and when there is a signal on all of the input lines to the AND circuit 148, the AND circuit 148 provides a Counter=All 1's signal on its output line 150. The output lines of the counter 144 are connected through inverters 152a–152f with an AND circuit 160, and when all of the inputs to the AND circuit 160 are ones, AND circuit 160 provides on its output line 162 the signal Counter=0. The line 150 constitutes an input to an AND circuit 164, and the line 162 constitutes an input to an AND circuit 166.

The AND circuit 164, in addition to line 150 as an input line, has input lines 168 and 170. The line 170 carries an Initiate Head Move signal derived from an Initiate Head Move latch 172 which has the line 98 applied to it as an input and which is set on the first negative pulse applied to the latch 172 from the line 98. The line 168 carries a Below Center signal derived from a Below Center latch 174 which has the Counter=All 1's signal on line 150 applied to it for setting it and thereby providing the Below Center signal on line 168. The Counter=All 1's signal on line 162 is applied to the reset terminal of the latch 174 so as to provide an Above Center signal on an output line 176 at this time. The AND circuit 166 has the Counter=0 signal on line 162, the Initiate Head Move signal on line 170 and the Above Center signal on line 176 applied to it as inputs.

The outputs of the AND circuits 164 and 166 are connected jointly to an OR circuit 178 the output of which is connected to the set terminal of a Referencing Complete latch 180. The reset terminal of the latch 180 is connected to the line 100 carrying the Initiate Track Referencing signal. The latch 180 has an output line 182 carrying a Referencing Complete signal, and the line 182 is applied as an input to an OR circuit 184 which also has the line 100 carrying the Initiate Track Referencing signal as an input. The output of the OR circuit 184 is connected to the reset terminal of the Initiate Head Move latch 172. The line 182 is also connected to the reset terminal of the latch 102.

The line 168 carrying the Below Center signal is applied as an input to an AND circuit 186, and the line 176 carrying the Above Center signal is applied as an input to an AND circuit 188. The AND circuits 186 and 188 respectively have the lines 136 and 140 as outputs. The line 168 carrying the Below Center signal is also applied onto an AND circuit 190, and the line 176 carrying the Above Center signal is also applied onto a corresponding AND circuit 192. The AND circuits 190 and 192 are supplied with pulses from a free running oscillator 194, and the output of the oscillator 192 is applied to an AND circuit 196 that also has the line 170 carrying the Initiate Head Move signal as an input. The output of the AND circuit 196 is on a line 198 that constitutes an input to a ÷2m circuit 200. The quantity m will subsequently be defined.

The output of the divider circuit 200 is the signal Step Motor Access Pulses on line 202, and line 202 is provided as inputs to the AND circuits 190 and 192 and also to a 1st Motor Pulse latch 204. The latch 204 is set by the first pulse on the line 202 and in this condition provides an output to an AND circuit 206 that also has the line 198 as an input. The AND circuit 206 has its output connected as inputs to AND circuits 186 and 188. The latch 204 has its reset terminal connected to line 100 carrying the Initiate Track Referencing signal.

The AND circuits 190 and 192 have their outputs connected respectively with OR circuits 208 and 210. An Access Reverse line 212 from the host system is connected as a second input to the OR circuit 208; and a corresponding Access Forward line 214, also from the host system, is connected as a second input to the OR circuit 210. The OR circuits 208 and 210 respectively provide the signals Step Reverse and Step Forward on their output lines 216 and 218, and the lines 216 and 218 are applied onto Step Motor Drivers & Control circuitry 220. The output of the circuitry 220 is on an output line 222, and this line is connected with the stepper motor 56.

Figure 2:
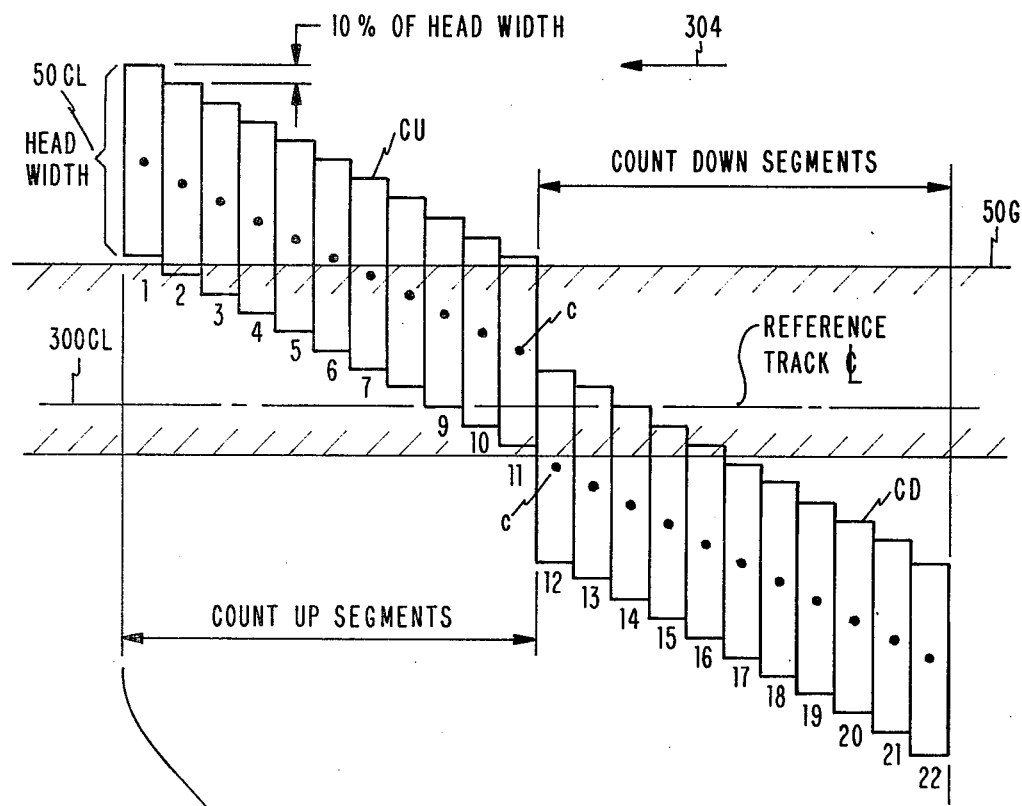
FIG. 2 is a plan view of a magnetic disk with encoding according to the invention and used in connection with the control circuit of FIGS. 1A–1C, with this figure also showing the composition of a burst of digital information on an outermost circular reference track of the disk.
Figure 2:
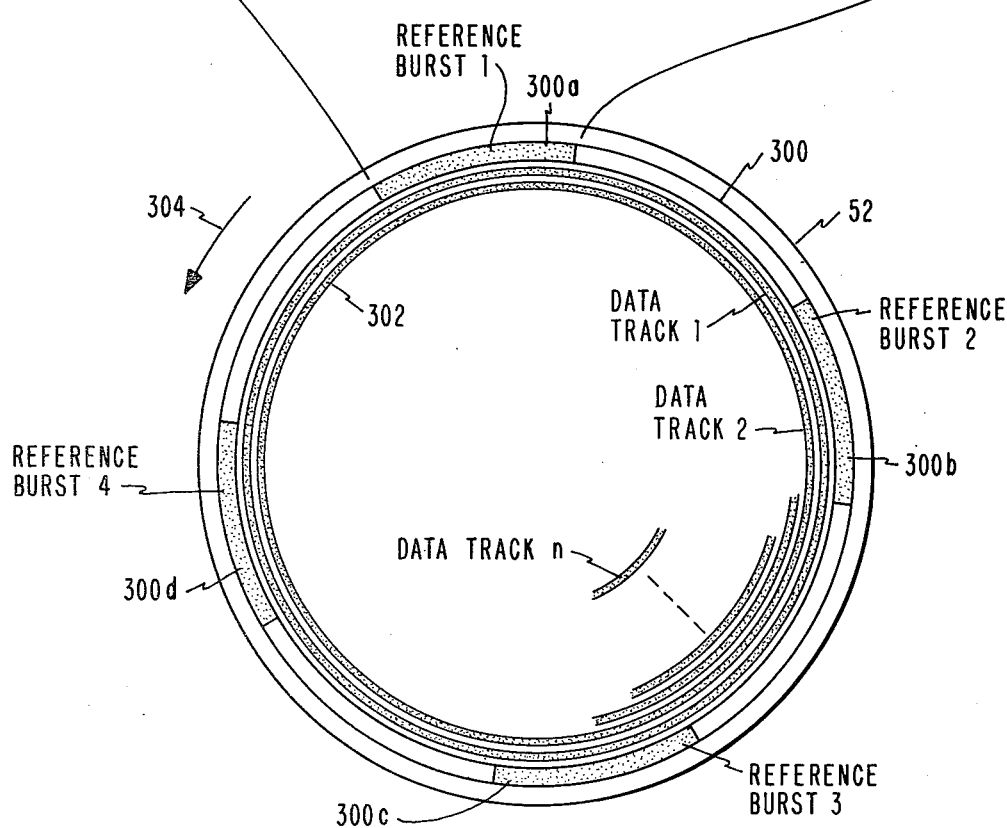

FIG. 2 may be referred to for an understanding of the reference magnetization on the disk 52 for use when the switch S is set in its uppermost position connecting the line 128 with the pulse voltage source 126. The disk 52 in this case has a single outermost circular reference track 300. A plurality of data tracks 302, such as data track 1, data track 2...data track n are within the reference track 300. The reference track 300 includes a plurality of spaced reference bursts 300a, 300b, 300c and 300d. It will be noted that the bursts 300a–300d are located at 90 degrees to each other on the disk 52.

The reference track 300 is previously written on the disk 52 and remains on the disk. The data tracks 302 may be previously written on the surface of the disk in which case the transducer 50 is used for reading the information on the tracks 302 after they have been previously located using the stepper motor 56. On the other hand, the tracks 302 may be vacant of information; and in this case the transducer 50 may be used for writing information on the tracks 302. The reference track 300 is used as a means for preliminarily substantially centering the transducer 50 with respect to the reference track 300 (with the center 50CL of the transducer being in substantial alignment with the center line 300CL of the reference track 300). The host system may then control the stepper motor 56 so as to provide the necessary number of electrical pulses to the stepper motor 56 to cause the transducer 50 to be moved to the desired one of the data tracks 302 from the reference track 300.

As shown in FIG. 2, the burst 300a includes 11 count up segments CU and 11 count down segments CD staggered radially of the disk. The bursts 300b–300d have the same composition as the burst 300a. The count up segments 1–11 are offset with respect to each other at 10% of the width of the gap in the transducer 50 (which is the same as the width of the head or transducer 50) and the same is true of the count down segments 12–22. The lengths of the segments 1–22 (which extend radially of the disk 52) are uniform and are equal to the length of the transducer gap. This offset of 10% of the head gap width is equal to the distance that the stepper motor 56 is effective to move the transducer 50 radially of disk 52 with one step of the motor 56. The staggering between the last count up segment 11 and the first count down segment 12 amounts to 60% of the head width so that the center line 300CL of the reference track 300 does not extend through the center c of any of the segments. The last count up segment 11 is thus staggered at 30% head gap width with respect to the center line 300CL and the same is true of the first count down segment 12, with the segments 11 and 12 having their centers c on opposite sides of the center line 300CL. The centers c of the segments 1–22 are of course staggered in the same manner as are the segments as just described. The disk 52 is driven rotatably in the direction 304 as shown in FIG. 2 so that the count up segments 1–11 come first under the transducer 50, prior to the count down segments 12–22.

Figure 3:
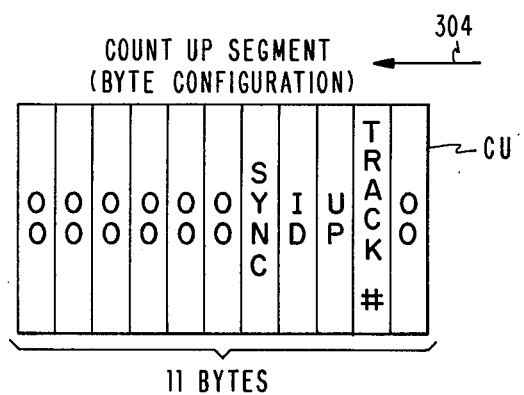
FIGS. 3 and 4 respectively show the byte configurations of count up segments and count down segments making up each of the bursts of reference information of the outermost reference track of the disk.
Figure 4:
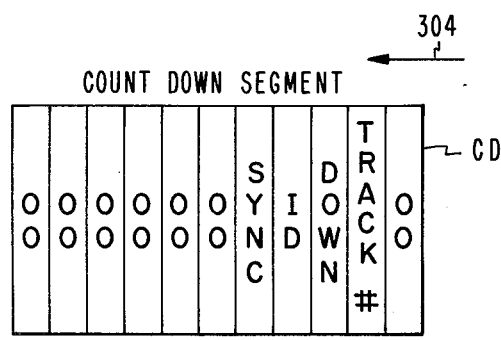

The composition of one of the count up segments CU is shown in FIG. 3 and includes 11 eight bit bytes. The first six bytes, considering the direction of rotation 304 of the disk 52, are all zeros. The seventh byte is a SYNC byte and may be 55 in hexadecimal or 01010101 bits. The eighth byte is an ID byte and may for example be FF in hexadecimal or all ones. The ninth byte is an UP byte and may for example be D7 in hexadecimal or bits 11010111. The tenth byte may be a track number byte and may vary with the track number of which the transducer 50 is at the time located. The track 300 is considered to be track 0. The eleventh byte consists of all zeros. A count down segment CD is shown in FIG. 4 and is the same as a count up segment except that a DOWN byte is used instead of an UP byte. A DOWN byte may consist of EB in hexadecimal or bits 11101011, for example. Each of the bits in each of the CU and CD segments exists and is uniform for the complete length of the segment (radially of the disk 52), and each of the bit patterns extends transversely of its segment (circumferentially of the disk 52) with the magnetic transitions on the disk 52 forming these bits extending radially for the full length of the segment. Thus the transducer 50, whether having its gap in register with all or only part of the length of each segment, will pick up the bit pattern of that segment as this segment passes beneath the transducer 50 with rotation of the disk 52.

The quantity m previously referred to in connection with the divider 200 is the same as the number of reference bursts in one revolution of the disk 52, which is four in this case. The divider will thus divide by $4 \times 2 = 8$. The capacity of the counter 144 should be at least $m \times n$, where n is the number of the CD segments or the number of CU segments in any one burst. The quantity n is 11 in this case, so the capacity of the counter 144 in this case is and should be at least $4 \times 11 = 44$.

The control circuitry shown in FIGS. 1A, 1B and 1C, when assembled together as shown in FIG. 1 and when used in connection with the previously recorded reference track 300 shown in FIG. 2 and with the switch S being in its uppermost position connecting the line 128 with the source 126 of + voltage, operates to control the stepper motor 56 so that it positions the transducer 50 with its center 50CL substantially on the center line 300CL of the reference track 300. This operation of the circuitry takes place in track referencing mode of the circuitry which is initiated by an Initiate Track Referencing pulse applied by the host system on line 100 which has the specific results to be described later. This position of the transducer 50 is its starting position from which the transducer 50 may subsequently be moved by stepping the motor 56 through predetermined numbers of steps so as to position the transducer 50 on any selected one of the data tracks 302. The host system is relied upon and is capable of providing the predetermined number of pulses to the stepper motor 56 so as to preliminarily move the transducer 50 to place the transducer 50 somewhere over the reference track 300, and this may be accomplished using conventional connections from the host system to the stepper motor 56. The gap of the transducer 50 may then have the disk path 50G across the disk 52, for example, as shown in FIG. 2.

As the disk 52 rotates in the direction 304, with the transducer 50 being somewhere over the reference track 300 (it is assumed that the transducer 50 is not centered on the track 300), either count up segments CU as shown in FIG. 3 or count down segments CD as shown in FIG. 4 or both are picked up magnetically by the transducer 50 from the disk 52. If the head gap is on path 50G, the head 50 will pick up segments 2 to 16 shown in FIG. 2. These segments in successive bit form are transmitted through the read channel 58 to the VFO Data Clock separator 60, and the compositions of the read channel 58 and separator 60 are conventional. The read channel 58 amplifies the signal from the transducer 50 and may also shape the bit pulses. The VFO Data Clock separator 60 separates read/clock pulses from read/data pulses and transmits the two on its output lines 62 and 64. The Read Clock pulses on line 62 are coincident with the data bits on line 64. The Read Data is put into the shift register 66, and the Read Clock pulses on line 62 shift the Read Data bits through the shift register 66. The shift register 66 is eight bits long so that it may contain at any one time any of the bytes of a count up segment CU as shown in FIG. 3 and any of the bytes of a count down segment CD as shown in FIG. 4 (or it may contain eight data bits). The first six bytes of either a count up segment CU as shown in FIG. 3 or a count down segment CD as shown in FIG. 4 consists of all zeros, and these 00 (in hexadecimal) bytes function to synchronize the Data Clock separator 60 in accordance with the conventional mode of operation of said separators.

The AND circuit 70 is so constructed that it recognizes only a SYNC byte which exists in either a count up segment CU or a count down segment CD just subsequent to the first six 00 bytes. When such a SYNC byte exists in the shift register 66, the AND circuit 70 provides its output to the Character Sync latch 80 and sets this latch. The latch 80 then provides an output on its output line 82 applied to AND circuit 84 so that each of the Read Clock pulses applied to AND circuit 84 pass through the AND circuit 84 to the eight bit counter 88. The counter 88 then begins to count up; and, for each eight clock pulses, counter 88 provides a Character Strobe signal on its output line 90. A Character Strobe signal on line 90 indicates for each series of eight pulses that a new character of eight bits exists in the shift register 66.

The Character Stobe signal on line 90 is used for two different applications. Firstly, the Character Stobe signal is used by the host system in normal data mode, when the transducer 50 is on one of the data tracks 302 and when there has been no Initiate Track Referencing pulse applied on line 100, to indicate that there is a character in the shift register 66 that the host system can take at this time as data, using character bus 68. Secondly, in the referencing mode, for which the circuitry of FIGS. 1A-1C is used and under the condition in which the host system provides an Initiate Track Referencing pulse on line 100, the Character Strobe signal on line 90 is applied onto and is used by AND circuits 72, 74, 76 and 78 which examine broadside the contents of the shift register 66.

Referring to FIGS. 3 and 4, it will be observed that the ID byte follows the SYNC byte for each of the count up segments CU and count down segments CD. This may consist of eight ones (FF in hexadecimal), and the AND circuit 72 is so constructed as to recognize only the ID byte. The AND circuit 72 thus provides an output signal on line 92. The Character Sync latch 80 is set, and thus a signal exists on both of the lines 82 and 92 so that AND circuit 86 is satisfied. The output of AND circuit 86 is supplied to latch 94 which is thus set so as to provide an output on line 96 connected to each of the AND circuits 74, 76 and 78.

The AND circuits 74, 76 and 78 have at this time an input supplied on line 98. The Initiate Track Referencing pulse on line 100 has previously supplied by the host system setting the latch 102. The timer 104 at this time provides an output on line 98, and this output continues for one revolution of disk 52. The three AND circuits 74, 76 and 78 are thus enabled at this time, assuming that a proper byte exists in the bus 68 from the shift register 66.

An UP byte follows the ID byte in a count up segment CU as will be observed from FIG. 3, and AND circuit 74 is so constructed as to provide an UP Character signal on its output line 106 on the existence of such UP byte in a countup segment. The UP Character signal on line 106 is supplied through AND circuit 116 and OR circuit 134 onto the UP count terminal of the UP/DOWN counter 144. The AND circuit 116 is enabled at this time since the switch S is in its upper position connecting the line 128 to the plus voltage source 126, and line 128 is one of the inputs to the AND circuit 116.

The AND circuit 78 is preliminarily enabled at the same time as the AND circuit 74 and is so constructed as to provide a DOWN Character signal on its output line 114 whenever a DOWN byte as in a count down segment shown in FIG. 4 follows the ID byte. The DOWN Character signal on line 114 is transmitted through the AND circuit 120 and the OR circuit 138 onto the DOWN count terminal of the UP/DOWN counter 144. The AND circuit 120 is enabled at this time since the plus voltage source 126 is connected with the line 128 which is one of the inputs of the AND circuit 120.

Thus, as the disk 52 rotates in the direction 304, each of the count up segments CU in a reference burst that are traversed by the transducer 50 will cause the UP/DOWN counter 144 to increment one count. Likewise, each of the count down segments in the burst that is traversed by the transducer 50 will cause the counter 144 to decrement one count. Assuming, for the purpose of example, that the transducer center 50CL is five steps above the reference track center line 300CL, the counter 144 will count up five more counts than it subsequently counts down due to the count down segments in the same burst, allowing the count of five to remain in the counter 144 at the end of the burst. The subsequent bursts in the same revolution of the disk 52 will likewise cause the counter 144 to have its internal count increased, so that a resultant count of 20 would be in the counter 144 at the end of one disk revolution. The content of the counter 144 indicates at this time the distance that the transducer center 50CL is spaced above or outwardly of disk 52 from the center line 300CL of the reference track 300. The initial count in the counter 144 is all zeros, and therefore all of the positions in the counter 144 during this operation will never contain ones. The AND circuit 148 therefore is not satisfied to provide the signal CTR=All 1's on its output line 150, and the Below Center latch 174 remains unset. The latch 174 thus under these conditions provides the Above Center signal on line 176 indicating that the transducer center 50CL is above or outwardly on the disk 52 with respect to the reference track center line 300CL.

The last two bytes of each count up segment CU (as well as the last two bytes of each count down segment CD) contain all zeros, since the reference track may be considered the 00 track. The AND circuit 76 is satisfied by the first of these 00 bytes, and this produces the 00 Character signal on line 108. OR circuit 110 thus provides a signal on line 112 which is applied to the latches 94 and 80 and to the counter 88 for resetting these components. The system is then ready to read the next CU or CD segment that comes underneath the transducer 50.

In the case in which the transducer center line 50CL is located below the reference track center line 300CL or toward the center of disk 52 with respect to center line 300CL, there will be more of the count down segments CD than of the count up segments CU traversed by the transducer 50 during one revolution of the disk 52. In this case, the UP/DOWN counter 144 contains a minus quantity and has counted up first to a plus quantity due to count up segments initially traversed by the transducer 50 and then downwardly to its final minus count due to the count down segments. The final minus quantity in the counter 144 indicates the distance that the transducer center line 50CL is located downwardly (inwardly of the disk 52) with respect to the reference center line 300CL. The counter 144 in counting first upwardly due to any countup segments traversed by the transducer 50 and then downwardly by a greater number of countdown segments traversed by the transducer 50 passes first through all zeros and then on the next step through all ones content of counter 144. The AND circuit 160 will be satisfied with all zeros content of the counter 144 and provides an output signal on line 162 at this time. This is applied onto the reset terminal of the Below Center latch 174, and the latch 174 remains in its reset condition in which it was initially. On the next decrementing step of the counter 144, it contains all ones, and at this time the AND circuit 148 is satisfied so as to produce the signal CTR=All 1's on line 150 supplied to the set terminal of the Below Center latch 174, setting the latch, so that at this time the Below Center signal exists on the line 168. The condition of the latch 174 thus indicates the last content of the counter 144 in its counting action and indicates that the transducer center line 50CL is located downwardly (or inwardly of the disk 204) with respect to the center line 300CL if the final content of the counter 144 is minus.

At the end of one revolution of the disk 52, with the counter 144 containing an indication by its count of the distance that the center line 50CL of the transducer 50 is spaced from the track center line 300CL, the timer 104 times out and the signal on the line 98 ceases. The AND circuits 74, 76 and 78 are thus disabled, since the line 98 is one of the inputs to each of these AND circuits; and no further incrementing or decrementing of the counter 144 can take place. The first negative going transition of the signal on the line 98 causes the Initiate Head Move latch 172 to be set, and the Initiate Head Move signal on line 170 is thus provided by the latch 172. The Initiate Head Move signal on line 170 is supplied to the AND circuit 196, and the AND circuit 196 thus gates oscillator pulses from the oscillator 194 to the divider 200. The divider 200 provides Step Motor Access Pulses on its output line 202 (one such pulse for each eight output pulses of oscillator 194 in this case, in which the quantity m=4), and these are applied to the AND circuits 190 and 192. If the center line 50CL of the transducer 50 is located outwardly of the center line 300CL, the count in the counter 144 is plus; and the latch 174 has the Above Center signal on its output line 176. The line 176 is applied to the AND circuit 192, so that the Step Motor Access Pulses, constituting the output of the divider 200, pass through the AND circuit 192 and the OR circuit 210 to the Step Motor Drivers & Control circuit 220. The circuit 220 then operates to step the motor 56 so as to move the transducer 50 downwardly (inwardly of the disk 52). On the other hand, if the content of the counter 144 is minus; the latch 174 is in set condition and provides the Below Center signal on its output line 168. The line 168 is applied onto the AND circuit 190 so that in this case the Step Motor Access Pulses constituting the output of the divider 200 are supplied through the AND circuit 190 and the OR circuit 208 to the Step Motor Drivers & Control circuit 220. In this case, the circuit 220 supplies the proper pulses to the motor 56 so as to move the transducer 50 upwardly (outwardly of the disk 52).

The first motor pulse on the line 202 is applied to the 1st Motor Pulse latch 204, and the latch 204 has its output applied to the AND circuit 206. The AND circuit 206 also has the output of the oscillator 194 applied to it through the line 198 and thus at this time passes oscillator pulses applied to AND circuits 186 and 188. If the transducer center 50CL is located above center (outwardly of disk 52) with respect to the reference track center line 300CL, the latch 174 is in reset condition and supplies the Above Center signal on line 176. Line 176 supplies this signal to the AND circuit 188 so that the oscillator pulses outputed by the AND circuit 206 pass through the AND circuit 188 to the line 140. These pulses are transmitted through the OR circuit 138 from the line 140 to the DOWN terminal of the UP/DOWN couner 144, and the counter 144 is thus decremented at the same time as the stepper motor 56 moves the transducer 50. Eventually, the counter 144 is decremented by a certain number of oscillator pulses on line 198 to a condition in which all of its cells have zeros in them, and this same number of oscillator pulses divided by 2 m is the number required to step the motor 56 to move the transducer center 50CL into substantial alignment with the reference track center line 300CL. At this time, the AND circuit 160 supplied by the counter 144 is satisfied and provides the CTR=0 signal on its output line 162. This signal passes through the AND circuit 166 and the OR circuit 178 to the set terminal of the Referencing Complete latch 180. The latch 180 thus at this time provides the Referencing Complete latch 180. The latch 180 thus at this time provides the Referencing Complete signal on the line 182, and this line supplies this signal to the reset terminal of the Track Referencing latch 102 to reset the latch 102. The reference operation is thus complete, and the counter 144 has been decremented to have all zeros in it, and the transducer 50 has been stepped downwardly (inwardly toward the center of disk 52) at this same time so that the transducer center 50CL is substantially on the reference track center line 300CL.

If the transducer 50 is located at a position below the reference track center line 300CL (inwardly of the disk 52), the content of the counter 144 will be a minus quantity. The counter 144 will have passed through the all zero state and then through the all ones state in reaching its eventual minus content; and, at the latter condition of the counter 144, the AND circuit 148 will have been satisfied to produce the signal CTR=All 1's on the line 150. The line 150 is connected to the set terminal of the Below Center latch 174, and thus the latch 174 provides on its output line 168 the Below Center signal commensurate with the minus content of the counter 144. The Below Center signal on line 168 is supplied to the AND circuit 190, and OR circuit 208 provides the Step Reverse (pulses) signal on line 216 applied to the Step Motor Drivers & Control circuit 220. These are then effective to step the motor 56 to move the transducer 50 and its center 50CL in particular upwardly (outwardly of disk 52) toward the reference track center line 300CL. The Below Center signal on line 168 is also supplied to the AND circuit 186 so that the oscillator pulses on line 198 are supplied through the AND circuit 206, the AND circuit 186, the line 136 and the OR circuit 134 to the UP count terminal of the counter 144. The counter 144 is thus incremented commensurately with stepping movement of the transducer 50 upwardly (outwardly of disk 52).

Eventually, the counter 144 with the application of the oscillator pulses to its UP count terminal counts upwardly sufficiently so that its content is all ones. At this time, the transducer 50 has stepped upwardly (outwardly from the center of disk 52) so that the transducer center line 50CL is substantially coincident with the reference track center line 300CL. With the contents of the counter 144 being all ones, the AND circuit 148 is satisfied and produces the signal CTR=All 1's on its output line 150. This signal is supplied through the AND circuit 164 and the OR circuit 178 to the set terminal of the Referencing Complete latch 180 setting this latch. The latch 180 then provides the Referencing Complete signal on its output line 182 that is applied to the reset terminal of the Track Referencing latch 102 thus resetting this latch and ceasing all referencing operations.

The transducer 50 is thus moved, whether it is initially located above or below the reference track center line 300CL, so that its center line 50CL is substantially coincident with the reference track line 300Cl. The FIG. 1 circuitry in a single reference revolution (before the One Revolution Timer times out) measures the distance the transducer 50 is off track center and stores this measurement as a quantity in counter 144. This quantity is then used to move the transducer 50 to track center in a starting position. The host system may then provide pulses on the stepper motor 56 so as to move the transducer 50 to a selected one of the data tracks 302 and may utilize the Access Reverse line 212 or the Access Forward line 214 for this purpose. The data on such a track may be transmitted to the host system on bus 68.

Figure 5:
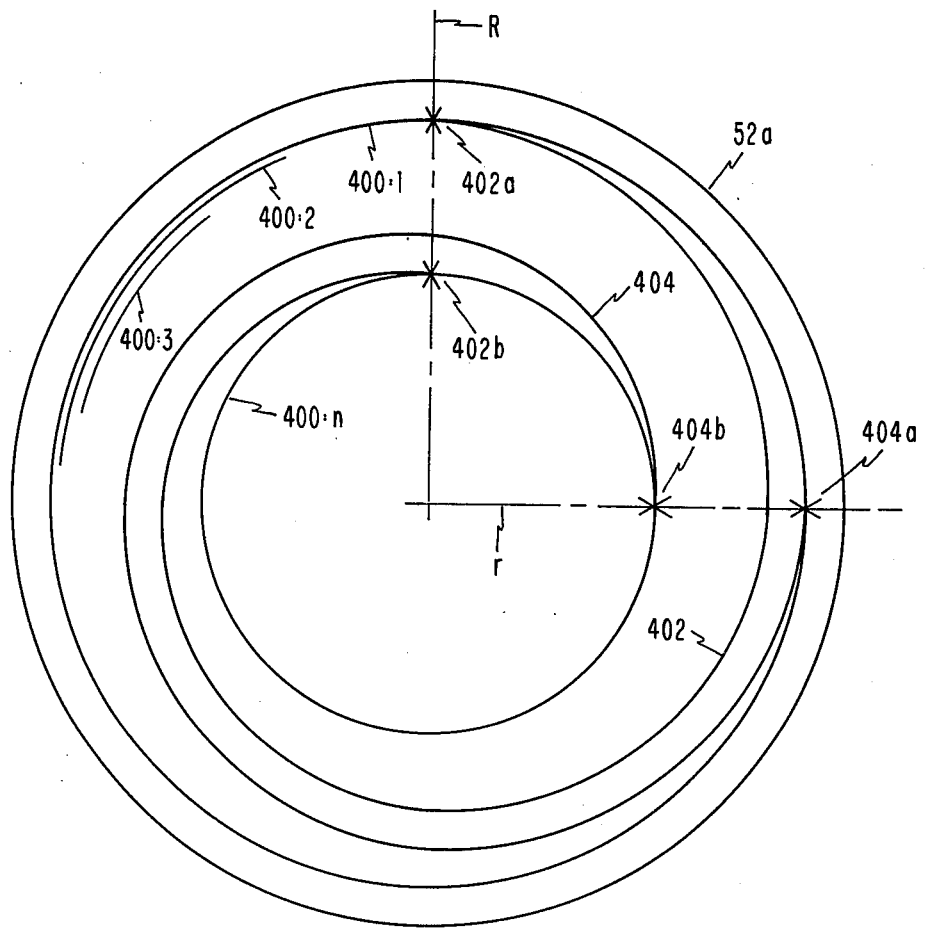
FIG. 5 is a plan view of a magnetic disk having a modified encoding of digital reference information in spiral track form.

The circuitry of FIGS. 1A–1C may also be used with the track format shown in FIGS. 5 and 6. The disk 52a shown in FIG. 5, which may be substituted beneath the transducer 50 for the disk 52, includes a series of concentric data tracks 400:1, 400:2, 400:3 . . . and 400:n. The disk 52a does not include a separate reference track, such as the track 300; but substantially the same reference data is encoded on the disk 52a in connection with the data tracks 400:1 to 400:n. More particularly, the reference data is encoded on the disk 52a in winding courses, particularly in spiral tracks 402 and 404, crossing the data tracks 400:1 . . . 400:n. The track 402 intersects the outermost data track 400:1 at point 402a and intersects the innermost data track 400:n at the point 402b. Both of the points 402a and 402b are on the same radius R of the disk 52a. The tack 404 intersects with the outermost data track 400:1 at the point 404a and intersects with the innermost data track 400:n at the point 404b. The points 404a and 404b are on the same radius r of the disk 52a which is disposed at 90 degrees with respect to the radius R. It will thus be observed that the spiral tracks 402 and 404 are 90 degrees out of rotational phase.

The composition of the spiral tracks 402 and 404 and the disposition of these tracks with respect to the data tracks 400, and particularly the data tracks 400:1, 400:2, 400:3, and 400:4 are shown in FIG. 6. It will be observed from FIG. 6 that the spiral track 102 is made up of alternate ones of count up segments CU and count down segments CD. The count up segment CU and the count down segments CD are staggered with respect to each other in the same manner as shown in FIG. 2 in connection with the burst 300a. Referring to FIG. 6, the count up segments CU used in connection with the data track 400:1 and above or outside of the track center line 400:1CL are eight in number, and they are staggered at 10% of the head gap width with respect to each other. Just inwardly of the outermost eight CU segments in the track 402, the track 402 contains eleven CD segments staggered at 10% gap width to each other, and these CD segments are used by both of the tracks 400:1 and 400:2. The staggering between the group of CU segments and the group of CD segments is 60% of the head or gap width, the same as shown in connection with the CU and CD segments in FIG. 2. More particularly, the adjacent CD and CU segments 1h and 1i are staggered this 60%. The data track center line 400:1CL, extends through the adjacent count up and count down segments 1h and 1i, and both of the segments are staggered at 30% of gap width on opposite sides of the center line 400:1CL.

The staggered CD and CU segments alternate along the reference track 402 until the track 402 reaches its point 402b, and the track 402 includes alternating groups of eleven CD segments and eleven CU segments from the track 400:1 inwardly. The center lines of all of the data tracks 400, such as 400:2CL, 400:3CL and 400:4CL, extend centrally through the reference track 402 in places at which the staggering between the CD and CU segments is the maximum of 60% as shown in FIG. 6.

The circuitry of FIGS. 1A, 1B and 1C, assembled as shown in FIG. 1, operates in substantially the same manner as before described to position the transducer center line 50CL on the center lines of any of the data tracks 400 as desired. The switch S for use with the magnetic patterns shown in FIGS. 5 and 6, is moved to its downward position connecting the line 128 with the line 124, and the line 124 is connected with the host system which is so arranged to provide a plus Odd signal when it is desired that the head 50 shall make registry with the center line of an odd track, 400:3 for example. The transducer 50 is moved into initial approximate alignment with the desired data track using conventional approaches, and the circuitry of FIGS. 1A–1C centers the transducer 50 on the center line of the desired data track, using the reference information in the spiral tracks 402 and 404 which cross the data tracks 400.

For the purpose of example, it may be asumed that it is desired that the transducer 50 have its center line 50CL moved into alignment with the center line 400:1CL of the first data track 400:1. The host system is effective for moving the transducer 50 so that the CU and CD segments adjacent the center line 400:1CL are effective on the transducer 50 as the disk 52a rotates. The transducer gap may have the path 50g as the disk 52a rotates (see FIG. 6). The transducer 50 detects the SYNC, ID and UP bytes of the count up segments CU and detects the SYNC, ID and DOWN bytes of the CD segments in the same manner as was the case in connection with these segments in the reference track 300, and the circuitry of FIGS. 1A-1C centers the transducer 50 on the center line 400:1cl passing through the point of greatest staggering of the CU and CD segments in the same way as was the case in connection with the center line 300CL of the reference track 300. The UP and DOWN bytes of the CU and CD segments increment and decrement the counter 144 in the same manner so that the counter content is a measure of the distance the head 50 is off track center, and the counter content controls the circuitry to step the stepper motor 56 correspondingly. The divider 200 is set to produce only one-half as many Step Motor Access Pulses on the line 202 in comparison with use of the FIG. 2 format, since the FIG. 5 formate includes the two reference tracks 402 and 404 instead of four such tracks which would correspond with the four bursts 300a-300d. The host system provides a + voltage on the line 124 for an odd numbered track 400 so that the AND circuits 116 and 120 function as previously described for incrementing the counter 144 on a count up segment and decrementing the counter 144 on a count down segment being detected by the transducer 50.

After the center of the data track has been determined in a revolution of the disk 52a and after the transducer 50 has been moved into alignment with the center of the data track, the transducer 50 may then be used (in data mode) to read the data on the data track. The shift register 66 accumulates the data read, and this is provided through the character bus 68 to the host system. None of the AND circuits 74, 76 and 78 in data mode pass characters to either increment or decrement the counter 144 since line 98 is inactive, and the circuitry of FIGS. 1A-1C thus cannot cause movement of the transducer 50 in data mode. Since none of the data fields contains an ID byte (hexadecimal FF or binary 11111111 in the data character set), data fields as they pass under transducer 50 will be ineffective on circuits in FIGS. 1A, 1B, and 1C when in a track referencing mode.

When it is desired that the circuitry of FIGS. 1A-1C shall be effective for centering the transducer 50 on the center line of an even data track, such as the center line 400:2CL, the host system drops the plus voltage on the line 124 to which the switch S is at present connected. The inverter 130 in this case provides a plus signal on the line 132 so that the AND circuits 118 and 122 to which this line is connected are partially enabled. No signal exists on the line 128 so that the AND circuits 116 and 120 to which this line is connected are disabled. The AND circuit 122 being thus partially enabled passed the UP Character signal on line 106 through the OR circuit 138 to the DOWN Count terminal of the UP/DOWN counter 144, and the AND circuit 118 being partially enabled passes the DOWN Character signal on line 114 through the OR circuit 134 to the UP Count terminal of the counter 144. This reversal of application of the UP Character and the DOWN Character signals is necessary since for the even tracks, such as track 400:2, the count down segments CD are detected prior to the count up segments CU. Thus for these tracks, the DOWN Character signals increment the counter 144 and the UP Character signals decrement the counter 144, and the content of the counter 144 indicates the position of head 50. The rest of the circuitry functions to step the motor 56 to move the transducer 50 over the center line of the desired even track, such as center line 400:2CL, in the same manner as has been previously described in connection with the center line 300CL of the reference track 300 shown in FIG. 2.

Advantageously, the track formatting shown in FIGS. 2 and 6 and the control circuitry of FIGS. 1A-1C allow the head to track registration function to be performed using an inexpensive stepper motor access mechanism instead of a more costly voice coil motor access mechanism under analog control. This is true since digital signals are both picked up by head 50 from the disk and also step the stepper motor 56, and the FIGS. 1A-1C circuitry uses no analog signals. Therefore, the same channel that is used for detecting digital data from the disk for use by a host system may be used for detecting the distance the transducer is off-center from the desired center line of a desired track, and the requirement for a separate reference or servo channel is eliminated. The magnetic format in which the digital reference data is incorporated in the two spiral tracks 402 and 404 eliminates the requirement for a separate reference track anywhere on the disk and allows the transducer 50 to be centered with respect to any of the data tracks. It is contemplated that the disks 52 and 52a may be of thin plastic coated with a magnetic material and such plastic exhibits substantial temperature and hygroscopic anisotropy, and these changes of dimension may be different on different axes of the disks. The reference track 300 allows a new detection of the reference track to be made at any time so that the host system may count more accurately to the desired data tracks within the reference track when such disk changes occur. In the case of the FIGS. 5-6 formatting, the reference information is incorporated in alignment with all of the data tracks, and using this reference information results in very accurate positioning of the transducer on the desired track, even though the disk material and access mechanism have different rates of expansion with changes in temperature and humidity.

The temperature and hygroscopic anisotropy manifests itself on approximately 90 degrees axes, and circularly recorded tracks become elliptical or egg-shaped with temperature and/or humidity changes. It can be shown mathematically that the average radius of an ellipse may be determined by taking the average of the length of any two radial lines eminating from the center of the ellipse as long as the radial lines are displaced 90 degrees one from the other. Thus, both the FIG. 2 and the FIGS. 5-6 reference track format allow the determination of an average track center even though changes in temperature and/or humidity have cause the recorder track to become egg-shaped. This is true, since the bursts 300a-300d in FIG. 2 are 90 degrees apart and the spiral tracks 402 and 404 of FIG. 5 are 90 degrees apart As is apparent from the preceding description, the spiral tracks 402 and 404 extend for 360 degrees about the disk 52a. It should be understood, however, that the total angle subtended by the spirals is determined by the disk system physical parameters. For example, if the number of data tracks 400 on the disk 52a were decreased to be one-half of the previous number, with the track density and all other parameters held constant, then the angle subtended by the spirals would be one-half, or 180 degrees. The total angle subtended on the disk 52a by the spiral tracks is uniquely determined by the radius of the outermost track, the number of tracks, the track density, the bit density, the offset or staggering of the CU and CD segments and the amount of stagger between the groups of CU and CD segments. Higher track densities may be attained, however, by recording additional spirals at equal intervals around the disk. For example, eight servo spirals recorded at 45 degree intervals would provide a very good first approximation of the shape of the track. This would allow an increased track density, because the head 50 could now be forced to follow the elliptical track by appropriately timed pulses to the access stepper motor 56.

The circuitry of FIGS. 1A–1C moves the transducer center 50CL very close to the centers of the reference track 300 or the data tracks 400; however, since this circuitry amounts to a digital system, there is a slight discrepancy of transducer position. This discrepancy after a track referencing operation may be expressed as a percentage of the width of the head 50 and its gap. The resolution of this track referencing technique is a function of the offset step size or stagger between adjacent count segments, which is shown in FIG. 2 as 10% of the width of the head or its gap. It should be understood that other offset steps or staggering are possible. The staggering between adjacent ones of the CU segments, for example, could be 5% of the head and gap width in lieu of the 10%. The resolution for this technique is plus or minus one-half of the offset step size. Thus, for the illustrated staggering of 10% of the head width, the resolution is plus or minus 5% of the head width. If the staggering is 5% of the head width instead of 10%, then the head location uncertainty after a track referencing operation would be plus or minus 2½% of the head width. Obviously, additional CU and CD segments would be required for this higher resolution system (in this case twice as many). If the higher resolution is desired for the spiral tracks 402 and 404, the penalty would be paid in loss of disk data capacity, because more of the disk surface area would be used for track reference information. It is also obvious that either the segment stagger of either 10% or 5% of head gap width need not equal one step of the motor 56, but this stagger could equal a multiple or sub-multiple of one motor step with a change of drive ratio between motor 56 and access arm 54.

As previously mentioned, the offset or staggering of the groups of CU and CD segments, where a CU segment (such as segment 11 in FIG. 2) adjoins a CD segment (segment 12 in FIG. 2), may be 60%. This stagger may however vary and may assume any value between 20% and 100% of the head or gap width, preferably in increments of 20%. The selection of the staggering between the groups of CU and CD segments is made based on the performance of the read channel 58 (i.e., what percentage of the segments CU and CD must be traversed by the head 50 in order to give acceptable read performance) and the desire to minimize the disk surface used to record the reference information, thus maximizing the amount of disk surface available for data. In the event that higher resolution is desired from the system which would be provided by offsetting the CU segments and the CD segments with respect to each other at 5% instead of 10% of the head width, for example, then the staggering between the groups of CD and CU segments may assume different values, such as between 10% and 100% of the head width in increments of 10%. Symmetry between the CU and CD segments about the track center line should, however, be maintained for proper operation of the circuitry.

Only the four reference bursts 300a, 300b, 300c and 300d have been described and shown in connection with the FIG. 2 magnetic formatting; however, it will be apparent that substantially the complete reference track 300 could be filled with bursts. The FIGS. 1A–1C circuitry would function in the same manner to substantially center the head center line 50CL on the track center line 300CL. The capacity of the counter 144 and the dividing capacity of the divider circuit 200 would be changed to accommodate the increased number of bursts on the track 300. In addition, when the complete track 300 is filled, it would not be necessary to have the groups of CU segments and CD segments slant downwardly as shown in FIG. 2, toward the center of the disk 52. Instead, the eleven CD segments could be repeated just subsequent to the illustrated CD segments in FIG. 2, with the CD segments progressively approaching the center line 300CL with their centers c. THe CU segments just following would then have their centers progressively farther from the center line 300CL. The track 300 would then be made up of the segments CU and CD in zig-zag configuration. A substantial filling of the reference track 300 with reference bursts would overcome in large part any defects of the disk 52 and any environmental electromagnetic noise that could disturb the functioning of the FIGS. 1A–1C circuitry.

Although the divider circuit 200 has been described as dividing by either eight or four; it will be understood that, depending on the particularly electrical stepper motor 56 that is used, it is only necessary that there be proportionality between the content of the counter 144 and the dividing power of the circuit 200. In fact, under certain conditions, the circuit 200 could act as a multiplier.

Although the reference track 300 is shown and described as being adjacent the outer edge of the disk 52, the track 300 could very well be located in other parts of the disk 52, such as in the middle of the data tracks (midway between data track 1 and data track n). In the latter case, the transducer 50 would have less misregistration with the data tracks in general if there are differences between the rates of growth of the disk 52 and the access arm 54 and its support structure with changes of temperature and humidity.

Writing of the reference information on either the disk 52 or the disk 52a, in either the dedicated reference track 300 or in the spiral tracks 402 and 404, may be accomplished in a similar manner. A transducer similar to the transducer 50 and operated by a stepper motor, similar to the stepper motor 56, may be used; and the controls are such that one full step of the stepper motor moves the associated transducer 10% of the head gap width. The head is located on an unrecorded disk close to the outer edge of the disk, and the disk is moved past the head in the direction 304. For the purpose of illustration, it will be assumed that the tracks 402 and 404 are being recorded, and the first reference segment 1a (see FIG. 6) is recorded and at 90 degrees of disk rotation later, the segment 1b is recorded. During the remaining 270 degrees of disk rotation, the head is moved one full step (10% of the head gap width) toward the center of the disk. Reference segment 1a is now read; and, when it is determined that segment 1a has passed under the head, segment 2a is immediately recorded. At 90 degrees of disk rotation later, the reference segments 1b and 2b are similarly treated. This process continues on subsequent disk revolutions until all desired reference segments CU and CD have been recorded, and the net result is that the two quadratured spiral tracks 402 and 404 have been completed to the innermost track 400:n. Advantageously, therefore, it is apparent that special fixtures or high precision disk drive mechanisms are not required to record the reference information of the invention.

We claim:
1. Data storage apparatus comprising:
   a moveable magnetic data storage medium having a magnetic track thereon,
   digital characters of a certain bit composition magnetically encoded with their centers on one side of the center line of said track and with their centers at different distances from said center line,
   digital characters of another certain bit composition magnetically encoded with their centers on the other side of the center line of said track and with their centers at different distances from the track center line,
   a transducer located to detect said magnetically encoded characters on said storage medium as said storage medium moves,
   a first circuit connected with said transducer and constructed to be responsive to only the bit composition of said digital characters having their centers on one side of the center line of said track,
   a second circuit connected with said transducer and constructed to be responsive to only the bit composition of said digital characters on the other side of the center line of said track, and
   means for comparing the numbers of digital characters of said different bit compositions detected by said transducer and said first and second circuits whereby to determine the position of said transducer with respect to said track center line.

2. Data storage apparatus as set forth in claim 1 and including motor means for moving said transducer across said magnetic track, and circuitry connecting said motor means with said comparing means for causing said motor means to move said transducer in response to the numbers of digital characters of said different bit compositions detected by said transducer so as to move said transducer into substantial alignment with said track center line.

3. Data storage apparatus as set forth in claim 1, said means for comparing the numbers of digital characters of said different bit compositions including a counter which is incremented by said digital characters of one of said certain bit compositions and is decremented by said digital characters of said other bit composition.

4. Data storage apparatus as set forth in claim 1, said first and second circuits connected with said transducer each including an AND circuit which is satisfied when all of its inputs are uniform and the data storage apparatus including a shift register for receiving bits from said transducer and being connected to provide them simultaneously to said AND circuits.

5. Data storage apparatus as set forth in claim 1, said comparing means including a counter which is incremented for said digital characters having their centers on one side of said track center line and which is decremented for said digital characters having their centers on the other side of said track center line, and motor means including a motor of the electrical stepping type responsive to the content of said counter for moving said transducer back toward said track center line a distance proportional to the content of the counter.

6. Data storage apparatus as set forth in claim 5 and including an oscillator for providing electrical stepping pulses to said stepper motor and a divider circuit connected between said oscillator and said stepping motor for providing a number of pulses to said stepping motor which is a sub-multiple of the number of counts contained in said counter indicating the distance the transducer should be moved in order to bring it substantially coincidental with said track center line.

7. Data storage apparatus as set forth in claim 5 and including means for providing electrical pulses to said counter when said stepping motor is stepped to move said transducer toward said track center line so as to thereby reduce the count in said counter as said transducer moves toward said track center line to keep the content of said counter proportional to the spacing of said transducer from said track center line.

8. Data storage apparatus as set forth in claim 1, said digital characters being of a uniform length transversely of said track center line.

9. Data storage apparatus as set forth in claim 1, said digital characters on each side of said track center line being in a series in which the digital characters have their centers at progressively increasing distances from said track center line.

10. Data storage apparatus as set forth in claim 1, said digital characters on each side of said track center line being in a series and having their centers spaced from said track center line at progressively greater distances and equal distances from character to character in the series, said characters being of uniform length.

11. Data storage apparatus as set forth in claim 1, said storage medium being a rotatable magnetic disk and said magnetic track being a track that is concentric with the center of rotation of the disk.

12. In a method for locating a transducer with respect to an information carrying track carried by a movable data storage medium with which track the transducer is in such close proximity to have an information transferring relationship with the track, the steps which comprise:
   encoding a plurality of digital characters of a certain bit composition in said track with their centers on one side of a longitudinal reference line located within said track and at different distances from said reference line,
   encoding a plurality of digital characters of another certain bit composition in said track with their centers on the other side of said reference line and at different distances from said reference line,
   detecting said digital characters of said two certain bit compositions using said transducer, and
   comparing the numbers of said digital characters of said two different bit compositions detected by said transducer so as to thereby determine the position of said transducer with respect to said longitudinal track reference line.

13. A method for locating a transducer as set forth in claim 12 and including the step of moving the transducer toward said longitudinal track reference line a distance proportional to the relative numbers of said digital characters of said two different bit compositions so as to thereby substantially center the transducer with respect to said track.

14. A method for locating a transducer as set forth in claim 12, said digital characters on each side of said longitudinal reference line being in a series and being arranged to have their centers at increasingly greater distances and equal distances from character to character with respect to said longitudinal reference line.

15. A method as set forth in claim 14, said digital characters being of uniform length.

16. An information storage medium movable in a certain direction across a transducer, said medium including:
a plurality of digital characters of a certain bit composition located on said medium on one side of a longitudinal reference line extending in said certain direction on the medium and with their centers at different distances from said reference line, and
a plurality of digital characters of another certain bit composition located on said medium with their centers on the other side of said reference line and at different distances from said reference line.

17. A data storage medium as set forth in claim 16, said digital characters being of equal length transversely of said reference line.

18. A data storage medium as set forth in claim 16, said digital characters on each side of said reference line being in a series in which the centers of the digital characters are progressively spaced greater distances and equal distances from character to character with respect to said reference line.

19. A magnetic disk encoded with a magnetic track thereon which includes first and second magnetically encoded segments having their centers on opposite sides of a certain circumferential line in said track, each of said segments including a series of bits spaced circumferentially with respect to each other and having transitions between consecutive bits that extend outwardly of the disk, the sequences of bits and the sequences of transitions of said first and second segments being different in a certain circumferential direction on the desk.

20. A magnetic disk having a plurality of magnetically encoded segments on a first side of a certain circumferential line on the disk and having a plurality of additional magnetically encoded segments on the second side of said line, each of said segments being digitally encoded with bits spaced circumferentially with respect to each other, the sequences of bits of said segments on said first side of said line being the same and the sequences of bits of said segments on said second side of said line being the same but different from the sequences of bits of said segments on said first side of said line, said segments on each side of said line having their centers located at different distances from said line.

21. A magnetic disk as set forth in claim 20, said segments all having the same length radially of the disk.

22. A magnetic disk as set forth in claim 20, said segments on each side of said circumferential line as a group of segments having their centers located at progressively equally greater distances from said circumferential line from one end segment of the group to the other end segment of the group.

23. A magnetic disk as set forth in claim 20, said segments on one side of said circumferential line as a first group having their centers at progressively equally greater distances from said line from a first end segment of this group to the other end segment of this group and said segments on the other side of said circumferential line as a second group of segments having their centers at progressively equally greater distances from said circumferential line from the first segment of this second group which is adjacent said first segment of said first group to the other end segment of this second group.

24. A magnetic disk as set forth in claim 23, said first segments of said two groups of segments having their centers at equal distances from said line which is greater than the distances between the centers of adjacent segments in the two groups radially of the disk.

25. A magnetic disk having a spiral reference track extending from a point adjacent to the outer edge of the disk inwardly toward the center of the disk, said reference track including first and second groups of magnetically encoded segments arranged alternately in said track, each of said segments being digitally encoded with a series of bits spaced circumferentially with respect to each other and with transitions between these bits extending outwardly of the disk, with the sequence of bits and the sequence of transitions between the bits of the segments of said first groups of segments being the same and with the sequence of bits and the sequence of transitions of said second groups of segments being the same but different from the sequence of bits and sequence of transitions of said first groups of segments.

26. A magnetic disk as set forth in claim 25, said segment groups being staggered with respect to each other.

27. A magnetic disk as set forth in claim 25, said segments in of each of said groups being staggered inwardly of the disk with respect to each other by a certain distance, and each of said segment groups being staggered inwardly of the disk at a distance that is greater than said certain distance.

28. A magnetic disk as set forth in claim 27, each of said segments being of equal length radially of the disk.

29. An information storage apparatus comprising:
a movable data storage medium having an information carrying track thereon,
first and second digital characters of different bit sequences encoded with their centers on opposite sides of a longitudinal reference line within said track,
a transducer located to detect said digital characters as said storage medium moves, and
a pair of detection means connected with said transducer and constructed to detect only said first and second digital characters respectively whereby said pair of detection means provides an indication of the position of said transducer with respect to said reference line.

30. An information storage apparatus as set forth in claim 29 wherein said digital characters of each of said bit sequences are a plurality and have their centers at different distances from said longitudinal reference line of said track.

31. An information storage apparatus as set forth in claim 30 and including means connected with said pair of detection means for storing the relative numbers of said digital characters of the two bit sequences detected by said transducer.

32. A magnetic disk having a reference track extending in a winding course inwardly of the disk, said track including first magnetically encoded segments and second magnetically encoded segments, said first and second segments being digitally encoded with a series of bits spaced circumferentially of the disk with respect to each other with the transitions between these bits extending outwardly of the disk, the sequence of bits and the sequence of transitions of said first segments being the same and the sequence of bits and the sequence of transitions of said second segments being the same but different from the sequence of bits and the sequence of transitions of said first segments, said first segments and said second segments being intermixed in said winding course so as to allow the position of a transducer in data transferring relationship with said disk and track to be determined by reading at least one of said first segments and at least one of said second segments on a single revolution of the disk.

33. A magnetic disk as set forth in claim 32, said track including groups of said first segments each group including a series of consecutive ones of said first segments and including groups of said second segments each group including a series of consecutive ones of said second segments, said groups of said first segments being alternated in said track with said groups of said second segments.

* * * * *